this description to be …

United States Patent Office 3,317,634
Patented May 2, 1967

3,317,634
CASTING COMPOSITION
Ruskin Longworth, Wilmington, Del., assignor to E. I. du Pont de Nemours and Company, Wilmington, Del., a corporation of Delaware
No Drawing. Filed Oct. 7, 1963, Ser. No. 314,545
2 Claims. (Cl. 260—878)

This invention relates to castable plastic compositions, and more particularly to castable compositions having a polymeric 1-olefin as the major resinous ingredient.

Many thermoplastic substances are known which can be formed into articles by melting them and forcing them into molds under high pressure, i.e., by injection molding and the like. However, such processes are not readily available to make massive articles. It has long been a desired object in the plastics industry to provide methods of fabricating plastic articles whereby the resinous article is fabricated by pouring a mix at substantially atmospheric pressure into a suitable mold. This technique, however, has been rarely successful.

It is an object of the present invention to provide a casting composition comprising a major amount of an olefin polymer.

This, and other objects of this invention which will become apparent hereinafter, are achieved by providing a casting composition comprising an intimate physical mixture of from 50 to 80 percent by weight of a solid partially crystalline polyolefin resin having a melt index, as defined hereinafter of from 100 to 500, together with 50 to 20 parts complementally of an acrylate monomer characterized by the chemical formula:

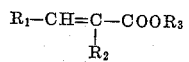

wherein $R_1$, $R_2$, and $R_3$ are aliphatic or alicyclic radicals having a total (for all three radicals) of from 6–20 carbons.

The aforesaid mixture may be fabricated into a casting by heating the mixture to substantially the solution temperature of the polyolefin in the monomer, adding an initiating amount of an initiator consisting of a free-radical generating agent having a half time of decomposition in the range between 1 hour, and 10 hours at the aforesaid solution temperature, immediately pouring the mixture into a mold and allowing the mold to stand until the mixture has solidified and cooled to substantially ambient temperature.

In a preferred embodiment of the invention the polyolafin resin is polyethylene which dissolved in a suitable acrylate monomer, preferably cyclohexyl methacrylate at a temperature of about 110° C. and an initiator such as dicumyl peroxide or t-butyl peracetate added in a catalytic amount, the mixture then being poured into a suitable mold.

It has been found particularly advantageous when thick-walled castings are being made to employ mixtures of two or more of the aforesaid acrylate monomers, or mixtures containing from about 50 to 80 weight percent of said acrylate monomers with a complemental amount of a vinyl ester having from 6 to 20 carbon atoms such as vinyl stearate. The use of such mixed monomers substantially enhances the toughness of the resulting castings and assists in the prevention of cracking during use, particularly use at somewhat elevated temperatures.

When the mixture is cast as described hereinabove there is an initial period which may be from about 1 to 10 minutes depending on the initiator employed during which the system remains quiescent. This time is utilized for preparing the mix and filling the mold. Thereafter reaction commences, which is indicated by a rapid rise in temperature of about 30–40° C. Some shrinkage occurs during the reaction and cooling stages. In many instances this may be accommodated by suitable mold design. However, if desired, hollows formed by shrinkage may be filled by adding a further quantity of the mix and again permitting reaction to occur while the molding is still hot.

With regard to the olefin polymers which may be employed in the practice of this invention, the homopolymers of ethylene which may be made at high pressures of about 10,000 to 40,000 p.s.i. at temperatures in the range from about 150 to 250° C. and the high density polyethylene generally made at low pressures (i.e., less than about 5000 p.s.i.) with catalysts such as aluminum oxide on silica-alumina and transition metal halides such as the titanium halides or vanadium halides, oxyhalides and the like, reduced with an organometallic reducing agent such as the aluminum alkyls and haloalkyls, Grignard reagents, hydrides of the alkali metals, or the like.

Copolymers of ethylene with minor amounts of other vinyl monomers which may be copolymerized with ethylene, or grafted to pre-formed ethylene polymers, such as 1-olefins having from 3–20 carbon atoms, unsaturated acids such as acrylic acid, methacrylic acid, maleic acid, fumaric acid, crotonic acid and the like, unsaturated esters suh as methyl methacrylate, vinyl acetate, vinyl stearate, unsaturated nitriles such as acrylonitrile, vinyl aromatic compounds such as styrene and methyl styrene, vinyl pyridine, vinyl pyrrolidone and the like, unsaturated ethers such as vinyl methyl ether, vinyl halides such as vinyl chloride, vinyl bromide, vinyl fluoride, tetrafluoroethylene may also be employed. Examples of such copolymers are ethylene/propylene copolymers, ethylene/butene-1 copolymers, ethylene octene-1 copolymers, ethylene/2 ethylhexene-1 copolymers, ethylene/4,4' dimethyl pentene-1 copolymers, ethylene/vinyl cyclohexene copolymers, ethylene/acrylic acid copolymers, ethylene/styrene copolymers, ethylene/acrylonitrile copolymers, ethylene methyl methacrylate copolymers, ethylene/vinyl pyridine copolymers, ethylene/vinyl chloride copolymers, ethylene/tetrafluoroethylene copolymers and the like.

It is also contemplated to employ crystalline or partially crystalline polymers of the 1-olefins, generally called "isotactic" polymers of the 1-olefins, which may be made by stereospecific catalysts such as titanium trichloride in the violet modification activated with an aluminum alkyl reducing agent, as the polyolefin component in the casting composition of this invention.

In making the casting compositions, the olefin polymers is preferably added to the mix in a comminuted or a powdery form in order to assist dissolution of the polymer in the vinyl monomer at the elevated temperatures employed in the preferred casting process of this invention. Alternatively, the polymers may be melted under vacuum to remove trapped gas and then the vinyl monomer added thereto.

In addition to casting the aforesaid casting mixtures above the solution temperature of the olefin polymer, castings may be made by employing an active, free-radical producing organic compound and starting at substantially room temperature. Satisfactory castings may be made with this process, but in general such castings are inhomogeneous and the particles of resin initially present may be discerned. Atractive compositions may then be made by pigmenting the olefin polymer, or the acrylate compound or both.

The polyolefin component should have a melt index in the range of about 100 to 500. The melt index of polyethylene is defined in ASTM specification D 1238–57T, as the melt flow of polyethylene measured under condition E of that specification. Whenever employed in this specification, the expression "melt index" refers to the melt flow determined under condition E of ASTM specification D 1238-57T.

Pigments, antioxidants, dyes, stabilizers, and the like may be added to the mixture or incorporated in the olefin polymer component of the casting mixture.

Many other modifications may be made without departing from the spirit of this invention which will be obvious to those skilled in the art.

The invention is further illustrated by the following specific examples which should not however be construed as fully delineating the scope of this discovery.

EXAMPLE 1

2750 gm. of a branched free radical polyethylene of melt index 300 were heated under 0.2 mm. Hg vacuum at 120° C. in order to obtain a gas-free molten mass. To the molten polyethylene was added, with stirring 2280 gm. of cyclohexyl methacrylate and 467 gm. of stearyl methacrylate while preparing the temperature in the range between 105° C. and 140° C. Vacuum was again applied to remove any volatile impurities and dissolved gases until the monomers boiled (34 mm. Hg) and were refluxed. The vacuum was broken, the temperature adjusted to 106° C., 16.5 gm. of t-butyl peracetate dispersed in 100 ml. of paraffin oil were added and the solution was stirred for 2½ minutes. The solution was poured into a spherical flask of 5 liters capacity, which had been preheated to 120° C., until the flask was full. The residual mix was poured into shallow trays to chill it rapidly. After a few minutes the temperature at the center of the flask rose to 160° C. and simultaneously the mixture polymerized and contracted. When the outside temperature of the flask had cooled to about 100° C., the material crystallized and a cavity formed on the surface of the casting. This was refilled by adding some of the unpolymerized mixture remaining from the original pouring after fusing with an overhead infrared heating lamp. The refill material polymerized and fused permanenlty to the original casting. After about 12 hours the flask was chilled in ice and broken off the casting. The resultant casting was homogeneous and appeared similar to polyethylene. The casting was repeatedly then heated in an oven to 70° C. and cooled to room temperature. No cracks or fissures developed.

EXAMPLE 2

The procedure and ingredients of Example 1 was employed except that the t-butyl peracetate initiator was replaced with dicumyl peroxide. A satisfactory, stable casting was produced.

EXAMPLE 3

70 parts of polyethylene having a melt index of 450 was fused at 110° C. and 30 parts of stearyl methacrylate was added. 0.5 part of t-butyl peracetate dispersed in a small amount of mineral oil was then added and the mixture cast in a flat pan to form a slab about 1″ in thickness. After a few minutes the temperature rose to 140° C. indicating that polymerization was occurring. The pan was placed in an oven at 120° C. for 1 hour to ensure substantially complete polymerization, then allowed to cool to room temperature. A tough slab of substantially void-free material, which appeared homogeneous, was produced.

By contrast a similar mix using 30 parts of polyethylene and 70 parts of stearyl methacrylate polymerized but cracked badly on cooling to room temperature.

I claim:
1. A casting composiiton consisting essentially of from 50 to 80 parts by weight of a 1-mono olefin polymer having a melt index in the range from 100 to 500 intimately mixed with from 50 to 20 parts by weight, complementally, of cyclohexyl methacrylate, stearyl methacrylate, or a mixture thereof, and an initiating amount of a free radical initiator having a half time of decomposition in the range from 1 to 10 hours at the solution temperature of about 110° C. of said polymer in said methacrylate.

2. A process for molding a massive article, comprising pouring into a mold for said article a casting composition consisting essentially of a solution of 50 to 80 parts by weight polyethylene having a melt index in the range from 100 to 500 in, complementally, 50 to 20 parts by weight of cyclohexyl methacrylate, stearyl methacrylate, or a mixture thereof, and in initiating amount of dicumyl peroxide or t-butyl peracetate and allowing the composition to solidify.

References Cited by the Examiner

UNITED STATES PATENTS 3,027,346  3/1962  Rugg et al. _____ 260—878

MURRAY TILLMAN, *Primary Examiner.*

GEORGE F. LESMES, D. J. BREZNER,
*Assistant Examiners.*